US012741505B2

(12) United States Patent
Lavrich et al.

(10) Patent No.: US 12,741,505 B2
(45) Date of Patent: *Sep. 22, 2026

(54) METHODS AND SYSTEMS FOR PROVIDING PREDICTIVE ENERGY CONSUMPTION FEEDBACK FOR POWERING A TRANSPORT CLIMATE CONTROL SYSTEM USING EXTERNAL DATA

(71) Applicant: THERMO KING LLC, Minneapolis, MN (US)

(72) Inventors: Philip Lewis Lavrich, Mooresville, NC (US); Mark D. Leasure, Eagan, MN (US); Casey Briscoe, Minnetonka, MN (US); Grant A. Baumgardner, Minneapolis, MN (US); Ryan Wayne Schumacher, Bloomington, MN (US); Wallace Stephen Hubbard, Chanhassen, MN (US); Panayu Robert Srichai, Minneapolis, MN (US); Matthew Srnec, Minnetonka, MN (US)

(73) Assignee: THERMO KING LLC, Minneapolis, MN (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/749,878

(22) Filed: Jun. 21, 2024

(65) Prior Publication Data

US 2024/0343089 A1 Oct. 17, 2024

Related U.S. Application Data

(63) Continuation of application No. 17/420,043, filed as application No. PCT/US2018/068142 on Dec. 31, 2018, now Pat. No. 12,017,505.

(51) Int. Cl.
*B60H 1/00* (2006.01)
*B60H 1/32* (2006.01)
*B60W 50/14* (2020.01)

(52) U.S. Cl.
CPC ....... *B60H 1/00771* (2013.01); *B60H 1/3232* (2013.01); *B60W 50/14* (2013.01); *B60W 2050/143* (2013.01)

(58) Field of Classification Search
None
See application file for complete search history.

(56) References Cited

U.S. PATENT DOCUMENTS 1,042,753 A 10/1912 Barton
3,875,483 A 4/1975 Farr
(Continued)

FOREIGN PATENT DOCUMENTS

CN 2456117 10/2001
CN 1885660 12/2006
(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Daniel L Greene
(74) *Attorney, Agent, or Firm* — HSML P.C.

(57) ABSTRACT

Systems and methods are provided for providing energy consumption feedback for powering a transport climate control system using external data. This includes determining whether an energy level of an energy storage source is greater than an expected energy consumption of a transport climate control system during a route, based on route
(Continued)

parameters and route conditions. The route conditions are obtained from a source such as a remote server, and include data such as weather data, traffic data, or the like. The systems and methods further compare current energy levels to an updated predictions of energy consumption during transit to determine if the energy level is sufficient to complete the route and alert the user when the energy level is insufficient to complete the route.

20 Claims, 6 Drawing Sheets

(56) References Cited

U.S. PATENT DOCUMENTS 5,104,037 A 4/1992 Karg et al.
5,231,849 A 8/1993 Rosenblatt
6,034,445 A 3/2000 Hewitt
6,191,708 B1 * 2/2001 Davidson ............... G08G 1/123 455/500
6,280,320 B1 8/2001 Paschke et al.
6,487,869 B1 12/2002 Sulc et al.
6,518,727 B2 2/2003 Oomura et al.
6,560,980 B2 5/2003 Gustafson et al.
6,600,237 B1 7/2003 Meissner
6,631,080 B2 10/2003 Trimble et al.
6,652,330 B1 11/2003 Wasilewski
6,700,214 B2 3/2004 Ulinski et al.
6,753,692 B2 6/2004 Toyomura et al.
6,925,826 B2 8/2005 Hille et al.
7,011,902 B2 3/2006 Pearson
7,120,539 B2 10/2006 Krull et al.
7,122,923 B2 10/2006 Lafontaine et al.
7,151,326 B2 12/2006 Jordan
7,176,658 B2 2/2007 Quazi et al.
7,206,692 B2 4/2007 Beesley et al.
7,327,123 B2 2/2008 Faberman et al.
7,424,343 B2 9/2008 Kates
7,449,798 B2 11/2008 Suzuki et al.
7,532,960 B2 5/2009 Kumar
7,728,546 B2 6/2010 Tanaka et al.
7,730,981 B2 6/2010 McCabe et al.
7,745,953 B2 6/2010 Puccetti et al.
7,806,796 B2 10/2010 Zhu
7,830,117 B2 11/2010 Ambrosio et al.
7,898,111 B1 3/2011 Pistel
7,900,462 B2 3/2011 Hegar et al.
8,020,651 B2 9/2011 Zillmer et al.
8,030,880 B2 10/2011 Alston et al.
8,134,339 B2 3/2012 Burlak et al.
8,170,886 B2 5/2012 Luff
8,214,141 B2 7/2012 Froeberg
8,295,950 B1 10/2012 Wordsworth et al.
8,381,540 B2 2/2013 Alston
8,441,228 B2 5/2013 Brabec
8,476,872 B2 7/2013 Truckenbrod et al.
8,487,458 B2 7/2013 Steele et al.
8,541,905 B2 9/2013 Brabec
8,602,141 B2 12/2013 Yee et al.
8,626,367 B2 1/2014 Krueger et al.
8,626,419 B2 1/2014 Mitchell et al.
8,643,216 B2 2/2014 Lattin
8,643,217 B2 2/2014 Gietzold et al.
8,670,225 B2 3/2014 Nunes
8,723,344 B1 5/2014 Dierickx
8,742,620 B1 6/2014 Brennan et al.
8,760,115 B2 6/2014 Kinser et al.
8,764,469 B2 7/2014 Lamb
8,767,379 B2 7/2014 Whitaker
8,818,588 B2 8/2014 Ambrosio et al.
8,862,356 B2 10/2014 Miller
8,912,683 B2 12/2014 Dames et al.
8,924,057 B2 12/2014 Kinser et al.
8,978,798 B2 3/2015 Dalum et al.
9,030,336 B2 5/2015 Doyle
9,061,680 B2 6/2015 Dalum
9,093,788 B2 7/2015 Lamb
9,102,241 B2 8/2015 Brabec
9,147,335 B2 9/2015 Raghunathan et al.
9,199,543 B2 12/2015 Okamoto et al.
9,313,616 B2 4/2016 Mitchell et al.
9,436,853 B1 9/2016 Meyers
9,440,507 B2 9/2016 Giovanardi et al.
9,463,681 B2 10/2016 Olaleye et al.
9,464,839 B2 10/2016 Rusignuolo et al.
9,557,100 B2 1/2017 Chopko et al.
9,562,715 B2 2/2017 Kundasamy
9,694,697 B2 7/2017 Brabec
9,738,160 B2 8/2017 Bae et al.
9,758,013 B2 9/2017 Steele
9,783,024 B2 10/2017 Connell et al.
9,784,780 B2 10/2017 Loftus et al.
9,802,482 B2 10/2017 Schumacher et al.
9,825,549 B2 11/2017 Choi et al.
9,846,086 B1 12/2017 Robinson et al.
9,893,545 B2 2/2018 Bean
9,931,960 B2 4/2018 Tabatowski-Bush et al.
9,975,403 B2 5/2018 Rusignuolo et al.
9,975,446 B2 5/2018 Weber et al.
9,987,906 B2 6/2018 Kennedy
10,000,122 B2 6/2018 Wu et al.
10,048,082 B2 8/2018 Meyer et al.
10,148,212 B2 12/2018 Schumacher et al.
10,230,236 B2 3/2019 Schumacher et al.
10,240,847 B1 3/2019 Thomas, Jr.
10,875,497 B2 12/2020 Srnec
10,995,760 B1 5/2021 Stubbs
11,034,213 B2 6/2021 Wenger et al.
2001/0025349 A1 9/2001 Sharood et al.
2002/0113576 A1 8/2002 Oomura et al.
2003/0043607 A1 3/2003 Vinciarelli et al.
2003/0106332 A1 6/2003 Okamoto et al.
2003/0200017 A1 10/2003 Capps et al.
2003/0201097 A1 10/2003 Zeigler et al.
2004/0168455 A1 9/2004 Nakamura
2005/0057210 A1 3/2005 Ueda et al.
2005/0065684 A1 3/2005 Larson et al.
2005/0285445 A1 12/2005 Wruck et al.
2006/0283965 A1 12/2006 Mueller et al.
2006/0284601 A1 12/2006 Salasoo et al.
2007/0052241 A1 3/2007 Pacy
2007/0192116 A1 8/2007 Levitt
2008/0147270 A1 6/2008 Sakane et al.
2008/0177678 A1 7/2008 Di Martini et al.
2008/0177994 A1 * 7/2008 Mayer ..................... G06F 16/00 709/224
2008/0281473 A1 11/2008 Pitt
2009/0121798 A1 5/2009 Levinson
2009/0122901 A1 5/2009 Choi et al.
2009/0126901 A1 5/2009 Hegar et al.
2009/0178424 A1 7/2009 Hwang et al.
2009/0195349 A1 8/2009 Frader-Thompson et al.
2009/0228155 A1 9/2009 Slifkin et al.
2009/0229288 A1 9/2009 Alston et al.
2009/0314019 A1 12/2009 Fujimoto et al.
2009/0320515 A1 12/2009 Bischofberger et al.
2010/0045105 A1 2/2010 Bovio et al.
2010/0089669 A1 4/2010 Taguch
2010/0230224 A1 9/2010 Hindman
2010/0312425 A1 12/2010 Obayashi et al.
2010/0320018 A1 12/2010 Gwozdek et al.
2011/0000244 A1 1/2011 Reason et al.
2011/0114398 A1 5/2011 Bianco
2011/0118916 A1 5/2011 Gullichsen
2011/0162395 A1 7/2011 Chakiachvili et al.
2011/0208378 A1 8/2011 Krueger et al.
2011/0224841 A1 9/2011 Profitt-Brown et al.
2011/0241420 A1 10/2011 Hering et al.
2011/0265506 A1 11/2011 Alston
2011/0290893 A1 12/2011 Steinberg
2012/0000212 A1 1/2012 Sanders et al.
2012/0116931 A1 5/2012 Meyers
2012/0153722 A1 6/2012 Nazarian

(56) References Cited

U.S. PATENT DOCUMENTS

2012/0198866 A1 8/2012 Zeidner
2012/0245772 A1 9/2012 King
2012/0310376 A1 12/2012 Krumm et al.
2012/0310416 A1 12/2012 Tepper et al.
2013/0000342 A1 1/2013 Blasko et al.
2013/0073094 A1 3/2013 Knapton et al.
2013/0088900 A1 4/2013 Park
2013/0158828 A1 6/2013 McAlister
2013/0173101 A1 7/2013 Gilman et al.
2013/0175975 A1 7/2013 Shinozaki
2013/0197730 A1 8/2013 Huntzicker
2013/0197748 A1 8/2013 Whitaker
2013/0231808 A1 9/2013 Flath et al.
2014/0018969 A1 1/2014 Forbes, Jr.
2014/0020414 A1 1/2014 Rusignuolo et al.
2014/0026599 A1 1/2014 Rusignuolo et al.
2014/0060097 A1 3/2014 Perreault
2014/0137590 A1 5/2014 Chopko et al.
2014/0203760 A1 7/2014 Lammers
2014/0230470 A1 8/2014 Cook
2014/0265560 A1 9/2014 Leehey et al.
2014/0277872 A1 9/2014 MacNeille et al.
2014/0283533 A1 9/2014 Kurtzman et al.
2014/0335711 A1 11/2014 Lamb
2014/0343741 A1 11/2014 Clarke
2015/0019132 A1 1/2015 Gusikhin et al.
2015/0081212 A1 3/2015 Mitchell et al.
2015/0121923 A1 5/2015 Rusignuolo et al.
2015/0168032 A1 6/2015 Steele
2015/0188360 A1 7/2015 Doane et al.
2015/0246593 A1 9/2015 Larson et al.
2015/0306937 A1 10/2015 Kitamura et al.
2015/0316301 A1 11/2015 Kolda et al.
2015/0344044 A1 12/2015 Yuasa
2015/0345958 A1 12/2015 Graham
2015/0355288 A1 12/2015 Yokoyama et al.
2015/0360568 A1 12/2015 Champagne et al.
2016/0011001 A1 1/2016 Emory et al.
2016/0035152 A1 2/2016 Kargupta
2016/0089994 A1 3/2016 Keller et al.
2016/0097652 A1 4/2016 Liu et al.
2016/0144764 A1 5/2016 Dutta et al.
2016/0156258 A1 6/2016 Yokoyama
2016/0252289 A1 9/2016 Feng et al.
2016/0280040 A1 9/2016 Connell et al.
2016/0285416 A1 9/2016 Tiwari et al.
2016/0291622 A1 10/2016 Al-Mohssen et al.
2016/0318368 A1* 11/2016 Alger ............... G08G 1/096791
2016/0327921 A1 11/2016 Ribbich et al.
2016/0377309 A1 12/2016 Abiprojo et al.
2017/0030728 A1 2/2017 Baglino et al.
2017/0057323 A1 3/2017 Neu et al.
2017/0063248 A1 3/2017 Lee et al.
2017/0098954 A1 4/2017 Ferguson et al.
2017/0107910 A1 4/2017 Huang
2017/0190263 A1 7/2017 Enzinger et al.
2017/0210194 A1 7/2017 Ling
2017/0217280 A1 8/2017 Larson et al.
2017/0219374 A1 8/2017 Sitarski et al.
2017/0237355 A1 8/2017 Stieneker et al.
2017/0255901 A1 9/2017 Bermudez Rodriguez et al.
2017/0259764 A1 9/2017 Da Silva Carvalho et al.
2017/0302200 A1 10/2017 Marcinkiewicz
2017/0313321 A1 11/2017 Asakura
2017/0349078 A1 12/2017 Dziuba et al.
2018/0022187 A1 1/2018 Connell et al.
2018/0029436 A1 2/2018 Zaeri et al.
2018/0029488 A1 2/2018 Sjödin
2018/0087813 A1 3/2018 Senf, Jr.
2018/0111441 A1 4/2018 Menard et al.
2018/0154723 A1 6/2018 Anderson et al.
2018/0170349 A1 6/2018 Jobson et al.
2018/0201092 A1 7/2018 Ahuja et al.
2018/0203443 A1 7/2018 Newman
2018/0222278 A1 8/2018 Mizuma
2018/0238698 A1 8/2018 Pedersen
2018/0306533 A1 10/2018 Alahyari et al.
2018/0326813 A1 11/2018 Ganiere
2018/0334012 A1 11/2018 Geller et al.
2018/0342876 A1 11/2018 Agnew et al.
2018/0342877 A1 11/2018 Yoo et al.
2018/0356870 A1 12/2018 Rusignuolo et al.
2019/0047496 A1 2/2019 Sufrin-Disler et al.
2019/0081489 A1 3/2019 Gerber et al.
2019/0086138 A1 3/2019 Chopko et al.
2019/0092122 A1 3/2019 Vanous et al.
2019/0123544 A1 4/2019 Pelegris et al.
2019/0184838 A1 6/2019 Lee et al.
2019/0255914 A1 8/2019 Ikeda et al.
2019/0277561 A1 9/2019 Spath
2019/0277647 A1 9/2019 Adetola et al.
2019/0283536 A1 9/2019 Suzuki et al.
2019/0283541 A1 9/2019 Adetola et al.
2019/0308487 A1 10/2019 Badger et al.
2020/0050753 A1 2/2020 Davis et al.
2020/0076029 A1 3/2020 Litz
2020/0086744 A1 3/2020 Schumacher et al.
2020/0101820 A1 4/2020 Wenger et al.
2020/0106271 A1 4/2020 Rydkin et al.
2020/0130471 A1 4/2020 Leasure
2020/0130473 A1 4/2020 Schumacher et al.
2020/0130645 A1 4/2020 Srnec
2020/0136504 A1 4/2020 Schumacher et al.
2020/0189361 A1 6/2020 Radcliff
2020/0207184 A1 7/2020 Schumacher et al.
2020/0231041 A1 7/2020 Lavrich et al.
2021/0061156 A1 3/2021 Swab

FOREIGN PATENT DOCUMENTS

CN 2912069 6/2007
CN 101713577 5/2010
CN 202038315 11/2011
CN 104539184 4/2015
CN 104734178 6/2015
CN 105711376 6/2016
CN 106184252 12/2016
CN 106766419 5/2017
CN 106774131 5/2017
CN 108074466 5/2018
CN 108931006 12/2018
CN 208306320 1/2019
CN 208650989 3/2019
DE 3817365 11/1989
DE 29715576 12/1997
DE 10138750 2/2003
DE 10200637 10/2003
DE 102011050719 12/2012
DE 102014208015 10/2015
EP 0282051 9/1988
EP 1935712 6/2008
EP 2365915 9/2011
EP 2689944 1/2014
EP 2717016 9/2014
EP 2942216 11/2015
EP 3343728 7/2018
EP 2768693 5/2019
EP 536552 9/2019
EP 3540340 9/2019
EP 3536552 11/2019
GB 2551999 1/2018
JP 2000158930 6/2000
JP 2007320352 12/2007
JP 2009243780 10/2009
JP 5772439 9/2015
JP 2018-136090 8/2018
JP 2019145521 8/2019
KR 10-2012-0092834 8/2012
SE 541327 7/2019
WO 03038988 5/2003
WO 2008153518 12/2008
WO 2009155941 12/2009
WO 2010065476 6/2010
WO 2011066468 6/2011

(56) References Cited

FOREIGN PATENT DOCUMENTS

| | | |
|---|---|---|
| WO | 2011094099 | 8/2011 |
| WO | 2012138497 | 10/2012 |
| WO | 2012138500 | 10/2012 |
| WO | 2013075623 | 5/2013 |
| WO | 2013096084 | 6/2013 |
| WO | 2014002244 | 1/2014 |
| WO | 2014/058610 | 4/2014 |
| WO | 2014085672 | 6/2014 |
| WO | 2014106060 | 7/2014 |
| WO | 2014106068 | 7/2014 |
| WO | 2016038838 | 3/2016 |
| WO | 2016145107 | 9/2016 |
| WO | 2017058660 | 4/2017 |
| WO | 2017/083336 | 5/2017 |
| WO | 2017083333 | 5/2017 |
| WO | 2017151698 | 9/2017 |
| WO | 2017/172855 | 10/2017 |
| WO | 2017172484 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/009798 | 1/2018 |
| WO | 2018005957 | 1/2018 |
| WO | 2018009646 | 1/2018 |
| WO | 2018017450 | 1/2018 |
| WO | 2018017818 | 1/2018 |
| WO | 2018029502 | 2/2018 |
| WO | 2018/204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/730,126, titled "Transport Climate Control System Power Architecture", filed Dec. 30, 2019, 27 pages.

U.S. Appl. No. 16/574,754, titled "Methods and Systems for Energy Management of a Transport Climate Control System", filed Sep. 18, 2019, 50 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/176,720, titled "Methods and Systems for Augmenting a Vehicle Powered Transport Climate Control System", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 41 pages.

U.S. Appl. No. 16/574,775, titled "Methods and Systems for Power and Load Management of a Transport Climate Control System", filed Sep. 18, 2019, 68 pages.

U.S. Appl. No. 17/420,022, titled "Methods and Systems for Providing Predictive Energy Consumption Feedback for Powering a Transport Climate Control System", filed Jun. 30, 2021, 34 pages.

U.S. Appl. No. 17/420,032, titled "Methods and Systems for Notifying and Mitigating a Suboptimal Event Occurring in a Transport Climate Control System", filed Jun. 30, 2021, 44 pages.

U.S. Appl. No. 17/420,037, titled "Methods and Systems for Providing Feedback for a Transport Climate Control System", filed Jun. 30, 2021, 37 pages.

U.S. Appl. No. 16/911,692, titled "Climate Controlled Vehicle, Transport Climate Control Equipment, Method of Retrofitting a Vehicle and Method of Operation", filed Jun. 25, 2020, 39 pages.

U.S. Appl. No. 16/565,110, titled "Transport Climate Control System With a Self- Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution To Transport Climate Control Systems Amongst One or More Electric Supply Equipment Stations ", filed Sep. 9, 2019, 41 pages.

European Patent Application No. 19382776.3, titled "Mprioritized Power Delivery for Facilitating Transport Climate Control", filed Sep. 9, 2019, 41 pages.

U.S. Appl. No. 16/565,282, titled "Optimized Power Cord for Transferring Power To a Transport Climate Control System ", filed Sep. 9, 2019, 43 pages.

U.S. Appl. No. 16/565,235, titled "Interface System for Connecting a Vehicle and a Transport Climate Control System", filed Sep. 9, 2019, 64 pages.

U.S. Appl. No. 16/565,205, titled "Transport Climate Control System With an Accessory Power Distribution Unit for Managing Transport Climate Control Loads", filed Sep. 9, 2019, 57 pages.

U.S. Appl. No. 17/015,190, titled "Optimized Power Distribution To Transport Climate Control Systems Amongst One or More Electric Supply Equipment Stations ", filed Sep. 9, 2020, 43 pages.

U.S. Appl. No. 16/147,708, titled "Methods and Systems for Autonomous Climate Control Optimization of a Transport Vehicle", filed Sep. 29, 2018, 41 pages.

U.S. Appl. No. 16/176,667, titled "Drive Off Protection System and Method for Preventing Drive Off", filed Oct. 31, 2018, 41 pages.

U.S. Appl. No. 16/565,252, titled "Demand-Side Power Distribution Management for a Plurality of Transport Climate Control Systems", filed Sep. 9, 2019, 44 pages.

U.S. Appl. No. 17/015,194, titled "Prioritized Power Delivery for Facilitating Transport Climate Control", filed Sep. 9, 2020, 41 pages.

(56) References Cited

OTHER PUBLICATIONS

International Search Report and Written Opinion, issued in the PCT International Patent Application No. PCT/US2018/068142, dated Apr. 3, 2019, 11 pages.

* cited by examiner 134
122
120
119
128
114
132
124
126
130
109

200
212
Transport Climate Control Load Network
255
Compressor
275
Heater
270
Condenser
265
Evaporator
260
Controller
114
HMI/ Communication Link
117
250
Converter
202
220
Utility Power
208
Utility Power Network
Charger
225
240
Power Module
230
Energy Storage
Energy Storage Management System
235
Auxiliary Power Network
206
Electric Machine
205
210
Prime Mover
Prime Mover Power Network
204

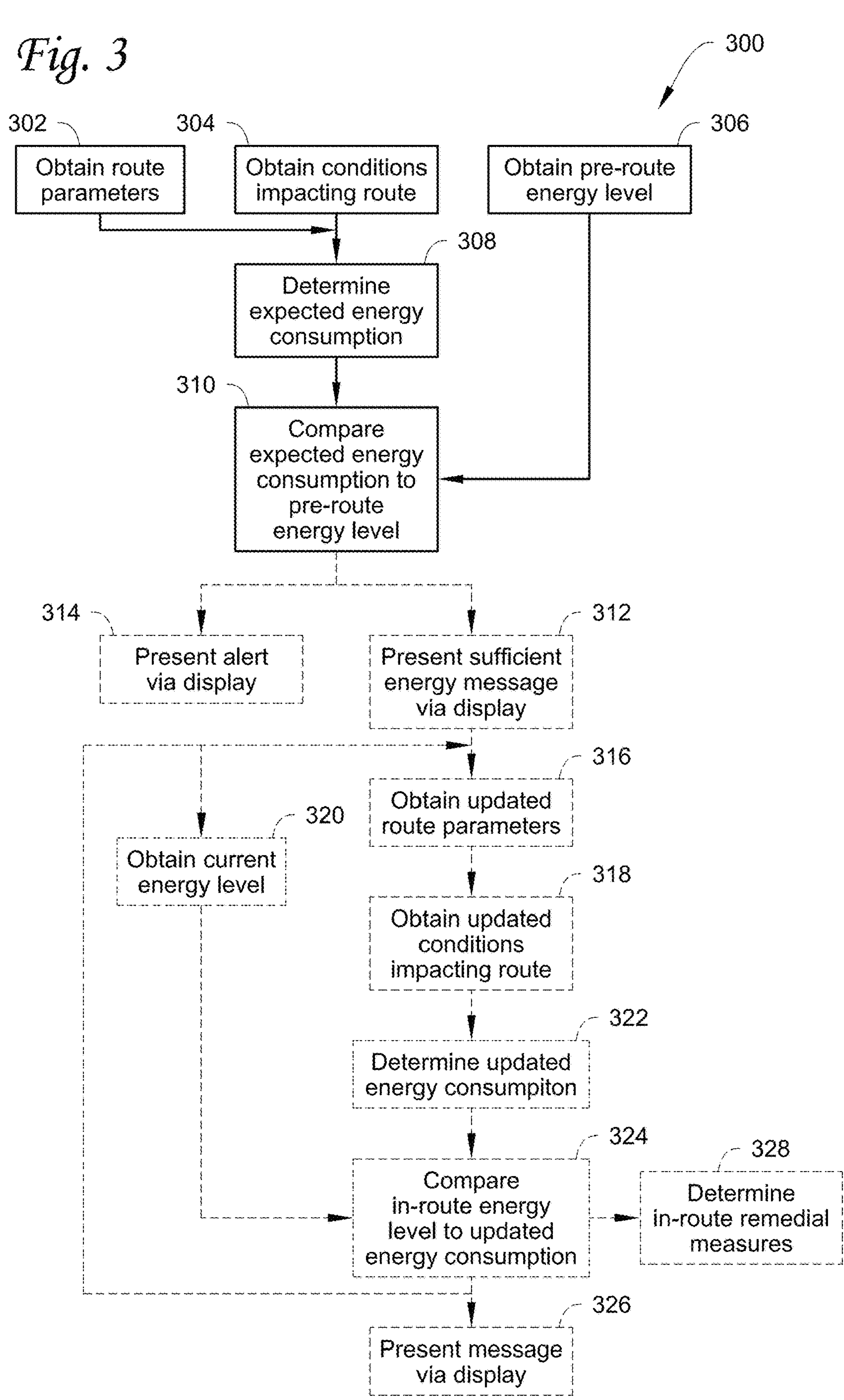
Fig. 3
300
302
Obtain route parameters
304
Obtain conditions impacting route
306
Obtain pre-route energy level
308
Determine expected energy consumption
310
Compare expected energy consumption to pre-route energy level
314
Present alert via display
312
Present sufficient energy message via display
316
Obtain updated route parameters
320
Obtain current energy level
318
Obtain updated conditions impacting route
322
Determine updated energy consumpiton
324
Compare in-route energy level to updated energy consumption
328
Determine in-route remedial measures
326
Present message via display

METHODS AND SYSTEMS FOR PROVIDING PREDICTIVE ENERGY CONSUMPTION FEEDBACK FOR POWERING A TRANSPORT CLIMATE CONTROL SYSTEM USING EXTERNAL DATA

CROSS-REFERENCE TO RELATED APPLICATIONS

This application is a continuation of U.S. application Ser. No. 17/420,043, filed Jun. 30, 2021, now U.S. Pat. No. 12,017,505.

FIELD

Embodiments of this disclosure relate generally to a climate control system for a transport unit. More specifically, the embodiments relate to methods and systems for providing energy consumption feedback for powering a transport climate control system using external data.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The TRS can maintain environmental condition(s) of the climate controlled space to maintain cargo (e.g., produce, frozen foods, pharmaceuticals, etc.). In some embodiments, the transport unit can include a HVAC system to control an environmental condition (e.g., temperature, humidity, air quality, etc.) within a passenger space of the transport unit.

SUMMARY

Embodiments of this disclosure relate generally to a climate control system for a transport unit. More specifically, the embodiments relate to methods and systems for providing energy consumption feedback for powering a transport climate control system using external data.

Users of transport climate control systems can face range uncertainty regarding whether a the transport climate control system has sufficient energy to maintain desired climate conditions within a climate controlled space during the duration of a route without requiring, for example, a stop for refreshing an energy storage source (e.g. charging a battery) powering the transport climate control system. Determining an expected energy consumption for the route and comparing the energy consumption to the amount of stored energy allows users to undertake routes that are known to be completed, even when there has not been an opportunity to fully refresh the energy storage source (e.g. by charging a battery).

Incorporating external data, for example weather data and traffic data into the determination of expected energy consumption can increase the precision of the estimate. Integration with routing software can increase the accuracy of the route data over manual input of the route as well as increasing case of use. Integration with routing software can further allow the routing software to match transport units and routes based on current energy levels, allowing efficient operations at the fleet level. Assigning routes based on the ability to complete those routes can increase the availability of transport units to fleets, even when there has not been an opportunity to fully refresh the energy storage source. Further, this can improve the ability to reduce risks of load loss that may occur when a transport climate control system runs out of energy while in transit.

In an embodiment, a method for providing energy consumption feedback for powering a transport climate control system using external data is provided. The method includes obtaining one or more route parameters, obtaining one or more conditions impacting the route via a communications link to a remote server, obtaining a pre-route energy level of an energy storage source supplying power to the transport climate control system, determining, using a controller, an expected energy consumption of the transport climate control system for the route based on the one or more route parameters and the one or more conditions impacting the route, comparing, using a controller, the expected energy consumption for the route to the pre-route energy level of the energy storage source, and when the expected energy consumption is less than the pre-route energy level of the energy storage source, displaying a message that the route can be completed via a display.

In an embodiment, the one or more route parameters include one or more of a route to be traveled by a transport unit including the transport climate control system, a type of goods being carried in a space conditioned by the transport climate control system, a number of stops to be made by the transport unit during the route, an estimated number of times a door of a climate controlled space of the transport unit will be opened during the route, an estimated amount of time the door of the climate controlled space will be open during the route.

In an embodiment, the one or more route parameters are obtained via user input at a human-machine interface.

In an embodiment, the one or more route parameters are obtained from a communications link to a dispatching server.

In an embodiment, the one or more conditions impacting the route include at least one of a weather forecast, current weather data, a traffic prediction, current traffic data, charging system location data, and customer delivery time constraints.

In an embodiment, the method further includes determining one or more remedial measures when the expected energy consumption is greater than the pre-route energy level of the energy storage source. In an embodiment, the one or more remedial measures include at least one of an alternate route for the transport unit and an adjusted set point for the transport climate control system.

In an embodiment, the method further includes receiving one or more updated route parameters and one or more updated conditions impacting the route while the transport unit including the transport climate control system is in transit, determining an updated energy consumption based on the one or more updated route parameters and the one or more updated conditions impacting the route, obtaining a current energy level of the energy storage source, comparing the updated energy consumption to the current energy level, and when the updated energy consumption is less than the current energy level of the energy storage source, displaying the message that the route can be completed via a display. In an embodiment, the method further includes determining one or more in-route remedial measures when the updated energy consumption is greater than the updated energy level of the energy storage source. In an embodiment, the one or more in-route remedial measures include at least one of an alternate route for the transport unit and an adjusted set point for the transport climate control system.

In an embodiment, a transport climate control system includes a communications link configured to wirelessly communicate with a remote server, an energy storage management system configured to determine an energy level of an energy storage source, a display, and a controller.

In an embodiment, the controller is configured to obtain one or more route parameters, obtain one or more conditions impacting the route from a remote server via the communications link, obtain a pre-route energy level of an energy storage source supplying power to the transport climate control system, determine an expected energy consumption of the transport climate control system for the route based on the one or more route parameters and the one or more conditions impacting the route, compare the expected energy consumption for the route to the pre-route energy level of the energy storage source, and direct display of a message that the route can be completed via the display when the expected energy consumption is less than the pre-route energy level of the energy storage source.

In an embodiment, the transport climate control system further includes a human-machine interface configured to accept input of the one or more route parameters.

In an embodiment, the communications link is a wireless modem.

In an embodiment, the communications link is configured to receive the one or more route parameters from the remote server.

In an embodiment, the transport climate control system is a transport refrigeration system.

In an embodiment, the energy storage source includes one or more batteries.

In an embodiment, the transport climate control system further includes a door sensor configured to determine when a door of a space conditioned by the transport climate control system is open or closed.

In an embodiment, the one or more route parameters include one or more of a route to be traveled by a transport unit including the transport climate control system, a type of goods being carried in a space conditioned by the transport climate control system, a number of stops to be made by the transport unit during the route, an estimated number of times a door of a climate controlled space of the transport unit will be opened during the route, an estimated amount of time the door of the climate controlled space will be open during the route.

In an embodiment, the one or more conditions impacting the route include at least one of a weather forecast, current weather data, a traffic prediction, current traffic data, charging system location data, and customer delivery time constraints.

In an embodiment, the controller is further configured to receive one or more updated route parameters and one or more updated conditions impacting the route while a transport unit including the transport climate control system is in transit, determine an updated energy consumption based on the one or more updated route parameters and the one or more updated conditions impacting the route, obtain a current energy level of the energy storage source, compare the updated energy consumption to the current energy level, and direct the display of the message that the route can be completed via a display when the updated energy consumption is less than the current energy level of the energy storage source.

DRAWINGS

References are made to the accompanying drawings that form a part of this disclosure and which illustrate embodiments in which the systems and methods described in this specification can be practiced.

FIG. 3 is a flowchart of a method for providing energy consumption feedback for powering a transport climate control system using external data.

DETAILED DESCRIPTION

Embodiments of this disclosure relate generally to a climate control system for a transport unit. More specifically, the embodiments relate to methods and systems for providing energy consumption feedback for powering a transport climate control system using external data.

Figure 1A:
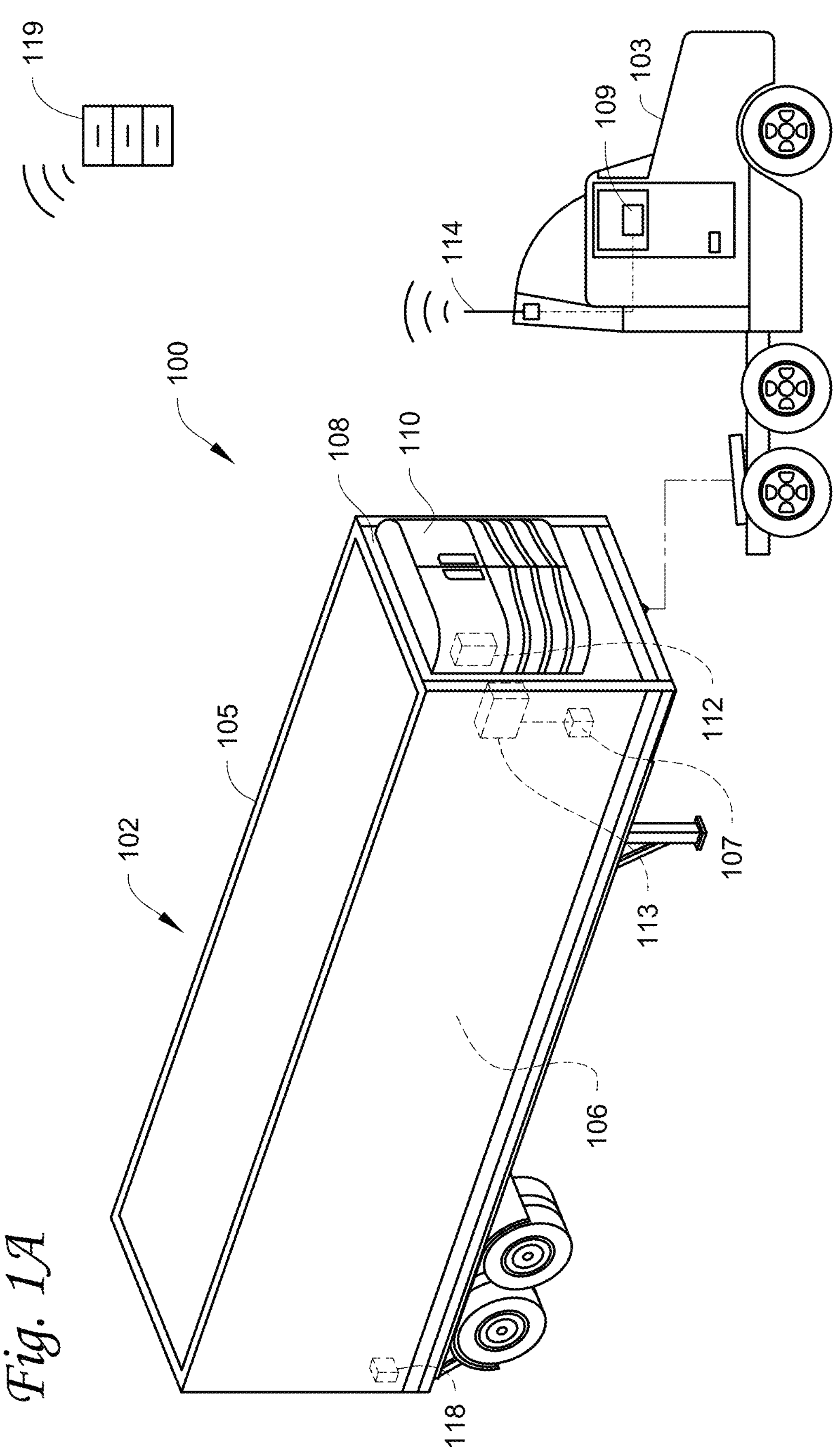
FIG. 1A illustrates a perspective view of a climate controlled transport unit with a transport climate control system attached to a tractor, according to one embodiment.

FIG. 1A illustrates one embodiment of a climate controlled transport unit 102 attached to a tractor 103. The climate controlled transport unit 102 includes a transport climate control system 100 for a transport unit 105. The tractor 103 is attached to and is configured to tow the transport unit 105. The transport unit 105 shown in FIG. 1A is a trailer. It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The transport climate control system 100 includes a climate control unit (CCU) 110 that provides environmental control (e.g. temperature, humidity, air quality, etc.) within a climate controlled space 106 of the transport unit 105. The transport climate control system 100 also includes a programmable climate controller 107 and one or more sensors (not shown) that are configured to measure one or more parameters of the transport climate control system 100 (e.g., an ambient temperature outside of the transport unit 105, a space temperature within the climate controlled space 106, an ambient humidity outside of the transport unit 105, a space humidity within the climate controlled space 106, solar intensity, etc.) and communicate parameter data to the climate controller 107. Sensors measuring solar intensity may include, for example, solar panels, a pyranometer, etc.

The CCU 110 is disposed on a front wall 108 of the transport unit 105. In other embodiments, it will be appreciated that the CCU 110 can be disposed, for example, on a rooftop or another wall of the transport unit 105. The CCU 110 includes a transport climate control circuit (see FIG. 2) that connects, for example, a compressor, a condenser, an evaporator and an expansion valve to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the transport climate control system 100 including the transport climate control circuit.

Climate controller 107 is configured to obtain one or more route parameters. The one or more route parameters may include, for example, a route to be traveled by the transport unit 105 including the transport climate control system 100, a type of goods being carried in the climate controlled space 106 conditioned by the transport climate control system 100, a number of stops to be made by the transport unit 105 during the route, an estimated number of times a door providing access to the climate controlled space 106 will be opened during the route, an estimated amount of time the door providing access to the climate controlled space 106 will be open during the route.

In an embodiment, climate controller 107 is configured to obtain the one or more route parameters via communications link 114, such as from a remote server 119. In an embodiment, the climate controller 107 is configured to direct display 109 to prompt a user to input the one or more route parameters, and obtains the one or more route parameters from a human-machine interface included in the display 109, for example in the form of a user input device such as a touch-screen, keyboard, keypad, or the like.

The climate controller 107 is configured to obtain one or more conditions impacting the route from the remote server 119 via the communications link 114. The one or more conditions impacting the route may include, for example, a weather forecast, current weather data, a traffic prediction, current traffic data, charging system location data, and customer delivery time constraints.

The climate controller 107 is configured to receive the energy level of the energy storage source, for example from an energy storage management such as a battery management system of a battery included in CCU 110.

The climate controller 107 is configured to determine an expected energy consumption of the transport climate control system 100 for the route based on the one or more route parameters and the one or more conditions impacting the route. The expected energy consumption may be determined by climate controller 107 using a mathematical model, such as a lookup table. The mathematical model may convert the one or more route parameters to energy values, such as based on predicted energy costs for climate control system run time, energy costs of door opening events, energy costs for pulldown following door opening events, and other such predicted costs. In an embodiment, the climate controller 107 may scale the energy costs based on the one or more conditions impacting the route. The scaling may include, for example, modifying the energy cost based on route duration and the energy cost based on door openings based on weather forecasts, modifying the energy cost based on route duration based on predicted traffic data, and the like. In an embodiment, the mathematical model is a lookup table. The predicted costs resulting from each of the one or more route parameters may be determined and then summed by climate controller 107 to result in the expected energy consumption for the route.

The climate controller 107 may be configured to compare the expected energy consumption for the route to the pre-route energy level of the energy storage source. Climate controller 107 may then direct display of a message that the route can be completed via the display 109 when the expected energy consumption is less than the pre-route energy level of the energy storage source.

In an embodiment, climate controller 107 is further configured to, while the tractor 103 and climate controlled transport unit 102 are in transit, receive one or more updated route parameters and one or more updated conditions impacting the route, determine an updated energy consumption based on the one or more updated route parameters and the one or more updated conditions impacting the route, obtain a current energy level of the energy storage source compare the updated energy consumption to the current energy level. In an embodiment, climate controller 107 directs the display of the message that the route can be completed via display 109 when the updated energy consumption is less than the current energy level of the energy storage source. In an embodiment, when the updated energy consumption is less than the current energy level of the energy storage source, climate controller 107 requests, via communications link 114, one or more remedial measures from remote server 119. The remedial measures may include, for example, an alternate route, an adjusted set point for operation of CCU 110, etc. When the remedial measures include an alternate route, the alternate route may be implemented, for example, climate controller 107 directing display of the alternate route on display 109. When the remedial measures include an adjusted set point for the transport climate control system the climate controller 107 may implement this remedial measure by directing CCU 110 to operate in accordance with the adjusted set point.

Communications link 114 is operatively connected to climate controller 107 and provides communication between climate controller 107 and remote server 119 such that climate controller 107 may, for example, obtain one or more conditions impacting the route from remote server 119. Communications link 114 may be, for example, a wireless modem configured to use a cellular data network such as 3G, 4G, LTE, or the like to communicate with remote server 119 via the internet.

Remote server 119 is a server, separate from the tractor 103 and climate controlled transport unit 102. Remote server 119 is configured to make one or more conditions impacting a route of the transport unit 105 available to climate controller 107. The one or more conditions impacting the route may include, for example, a weather forecast, current weather data, a traffic prediction, current traffic data, charging system location data, and customer delivery time constraints. In an embodiment, remote server 119 is incorporated into or in communication with a dispatching or fleet management system. In an embodiment, remote server 119 is configured to supply climate controller 107 with one or more of the route parameters including, for example, the route to be traveled by the transport unit including the transport climate control system, the type of goods being carried in a space conditioned by the transport climate control system, the number of stops to be made by the transport unit during the route, the estimated number of times a door of the space conditioned by the transport climate control system will be opened during the route, the estimated amount of time the door providing access to the climate controlled space 106 will be open during the route, etc.

Tractor 103 includes display 109. The display 109 may be connected to climate controller 107, and climate controller 107 may direct particular messages such as alerts and notifications to be presented on display 109. In an embodiment, display 109 further includes a user input such as a touch-screen, keypad, keyboard, or the like to serve as a human-machine interface (HMI), for example to prompt the input of and accept input of one or more route parameters such as route duration, number of door opening events, average duration of door opening events, and the like.

The climate controlled transport unit 102 includes door sensor 118 located at a door (not shown) of the climate controlled space 106 and configured to determine whether the door (not shown) of climate controlled space 106 is open or closed. Door sensor 118 may be, for example, a mechanical, electrical, or optical sensor. Door sensor 118 may be in communication with climate controller 107, for example via wired or wireless communications.

Figure 1B:
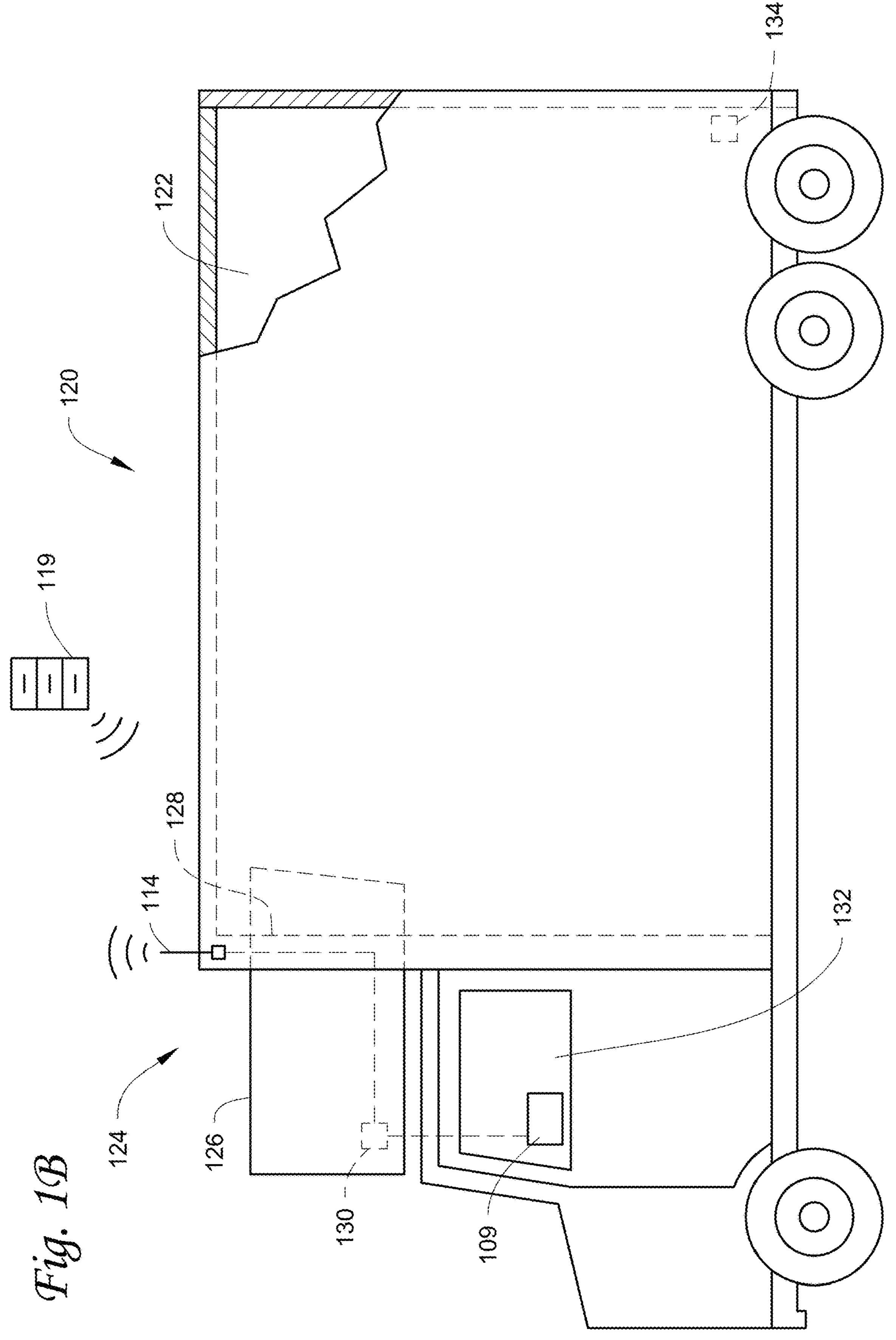
FIG. 1B illustrates a side view of a truck with a transport climate control system, according to one embodiment.

FIG. 1B depicts a temperature-controlled straight truck 120 that includes a climate controlled space 122 for carrying cargo and a transport climate control system 124. The transport climate control system 124 includes a CCU 126 that is mounted to a front wall 128 of the load space 112. The CCU 126 is controlled via a climate controller 130 to provide climate control within the climate controlled space 122. The CCU 126 can include, amongst other components, a transport climate control circuit (see FIG. 2) that connects, for example, a compressor, a condenser, an evaporator and an expansion valve to provide climate control within the climate controlled space 122.

The transport climate control system 124 also includes a programmable climate controller 130 and one or more sensors (not shown) that are configured to measure one or more parameters of the transport climate control system 124 (e.g., an ambient temperature outside of the truck 120, a space temperature within the climate controlled space 122, an ambient humidity outside of the truck 120, a space humidity within the climate controlled space 122, solar intensity, etc.) and communicate parameter data to the climate controller 130. The climate controller 130 is configured to control operation of the transport climate control system 124 including the transport climate control circuit. Sensors measuring solar intensity may include, for example, solar panels, a pyranometer, etc.

Straight truck 120 includes communications link 114 as described above. Communications link 114 allows climate controller 130 to communicate with remote server 119 as described above. Straight truck 120 includes display 109, for example located in the cabin 132.

The straight truck 120 includes door sensor 134 located at a door (not shown) of the climate controlled space 122 and configured to determine whether the door (not shown) of climate controlled space 122 is open or closed. Door sensor 134 may be, for example, a mechanical, electrical, or optical sensor. Door sensor 134 may be in communication with climate controller 130, for example via wired or wireless communications.

Figure 1C:
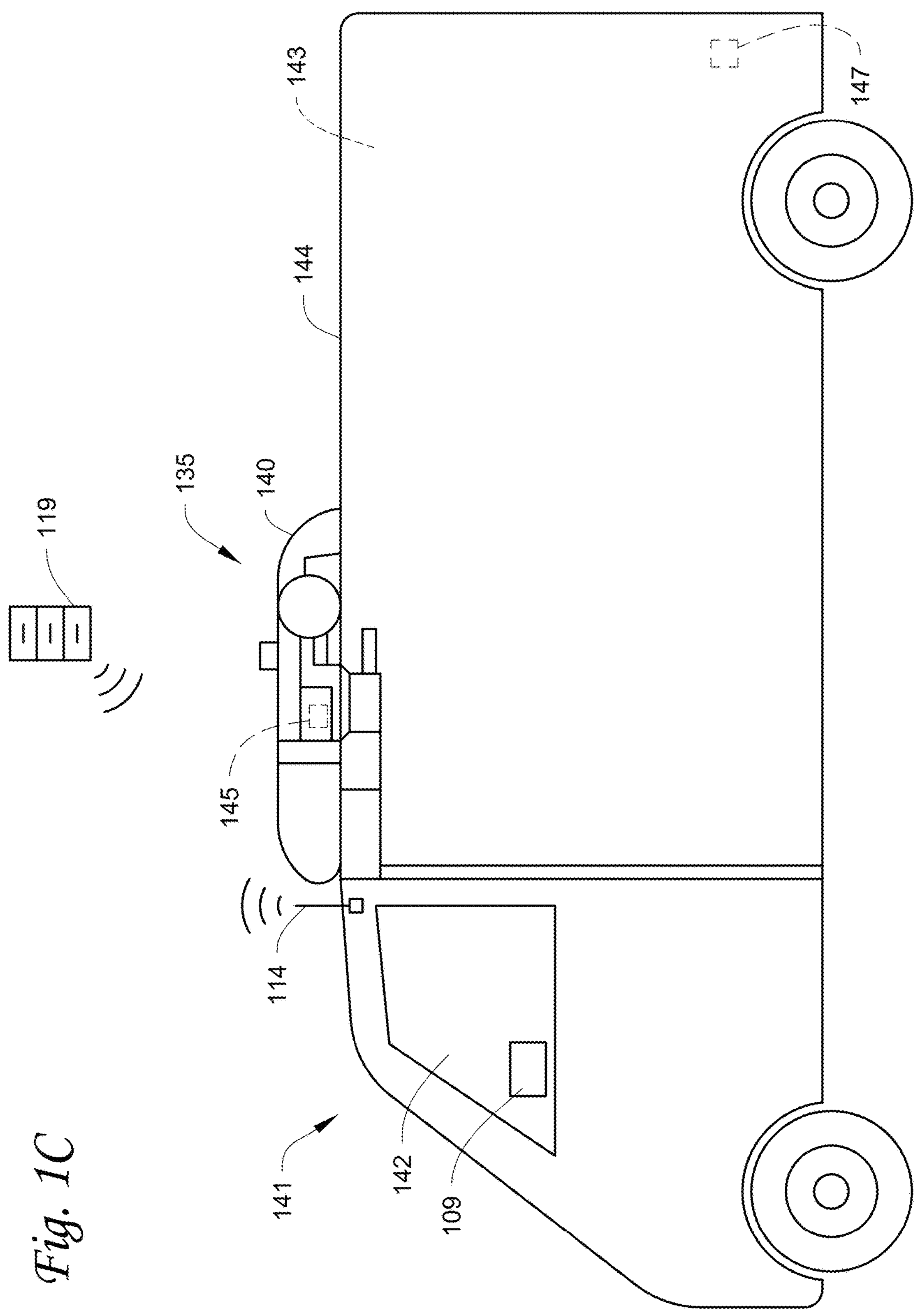
FIG. 1C illustrates a side view of a van with a transport climate control system, according to one embodiment.

FIG. 1C depicts a temperature-controlled van 141 that includes a climate controlled space 143 for carrying cargo and a transport climate control system 135 for providing climate control within the climate controlled space 143. The transport climate control system 135 includes a CCU 140 that is mounted to a rooftop 144 of the climate controlled space 143. The transport climate control system 135 can include, amongst other components, a transport climate control circuit (see FIG. 2) that connects, for example, a compressor, a condenser, an evaporator and an expansion valve to provide climate control within the climate controlled space 143.

The transport climate control system 135 also includes a programmable climate controller 145 and one or more sensors (not shown) that are configured to measure one or more parameters of the transport climate control system 135 (e.g., an ambient temperature outside of the van 141, a space temperature within the climate controlled space 143, an ambient humidity outside of the van 141, a space humidity within the climate controlled space 143, solar intensity, etc.) and communicate parameter data to the climate controller 145. The climate controller 145 is configured to control operation of the transport climate control system 135 including the transport climate control circuit. Sensors measuring solar intensity may include, for example, solar panels, a pyranometer, etc.

Temperature-controlled van 141 includes communications link 114 as described above. Communications link 114 allows climate controller 145 to communicate with remote server 119 as described above. Temperature-controlled van 141 includes display 109, for example located in the cabin 142 of the temperature controlled van 141.

The temperature controlled van 141 includes door sensor 147 located at a door (not shown) of the climate controlled space 143 and configured to determine whether the door (not shown) of climate controlled space 143 is open or closed. Door sensor 147 may be, for example, a mechanical, electrical, or optical sensor. Door sensor 144 may be in communication with climate controller 145, for example via wired or wireless communications.

Figure 1D:
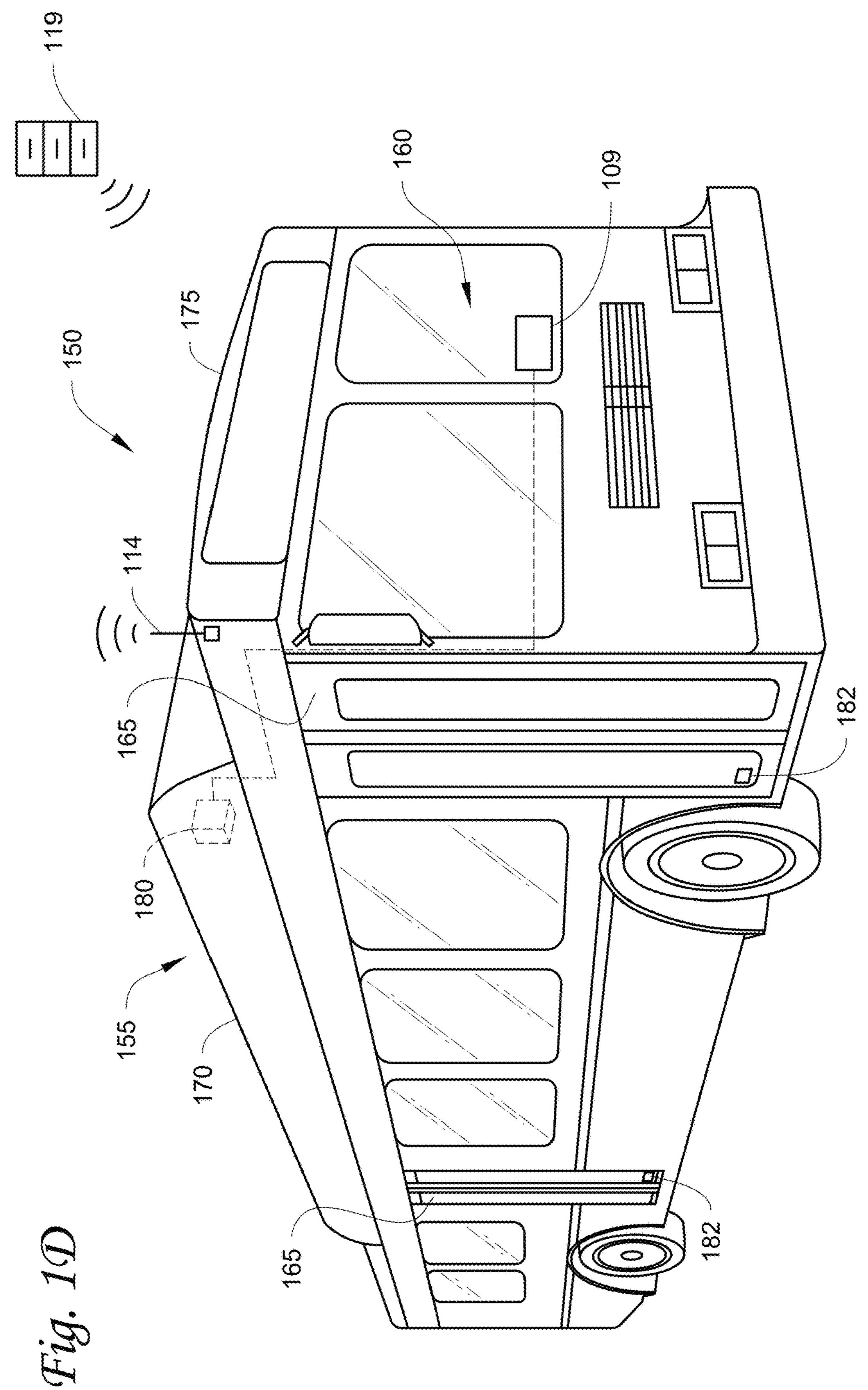
FIG. 1D illustrates a perspective view of a passenger vehicle including a transport climate control system, according to one embodiment.

FIG. 1D is a perspective view of a vehicle 150 including a transport climate control system 155, according to one embodiment. The vehicle 150 is a mass-transit bus that can carry passenger(s) (not shown) to one or more destinations. In other embodiments, the vehicle 150 can be a school bus, railway vehicle, subway car, or other commercial vehicle that carries passengers. The vehicle 150 includes a climate controlled space (e.g., passenger compartment) 160 supported that can accommodate a plurality of passengers. The vehicle 150 includes doors 165 that are positioned on a side of the vehicle 150. In the embodiment shown in FIG. 1D, a first door 165 is located adjacent to a forward end of the vehicle 150, and a second door 165 is positioned towards a rearward end of the vehicle 150. Each door 165 is movable between an open position and a closed position to selectively allow access to the climate controlled space 160. The transport climate control system 155 includes a CCU 170 attached to a roof 175 of the vehicle 150.

The CCU 170 includes a transport climate control circuit (not shown) that connects, for example, a compressor, a condenser, an evaporator and an expansion device to provide conditioned air within the climate controlled space 160. The transport climate control system 155 also includes a programmable climate controller 180 and one or more sensors (not shown) that are configured to measure one or more parameters of the transport climate control system 155 and communicate parameter data to the climate controller 180. The climate controller 180 may comprise a single integrated control unit or may comprise a distributed network of climate controller elements. The number of distributed control elements in a given network can depend upon the particular application of the principles described herein. The climate controller 180 is configured to control operation of the transport climate control system 155 including the HVAC circuit.

Vehicle 150 includes communications link 114 as described above. Communications link 114 allows climate controller 180 to communicate with remote server 119 as described above. Vehicle 150 includes display 109, within the climate controlled space 160, for example in view of the driver's seat (not shown).

The vehicle 150 includes door sensors 182, positioned, for example, at each of doors 165 and configured to determine whether any of doors 165 are open or closed. Door sensors 182 may be, for example, mechanical, electrical, or optical sensors. Door sensors 182 may be in communication with climate controller 180, for example via wired or wireless communications.

Figure 2:
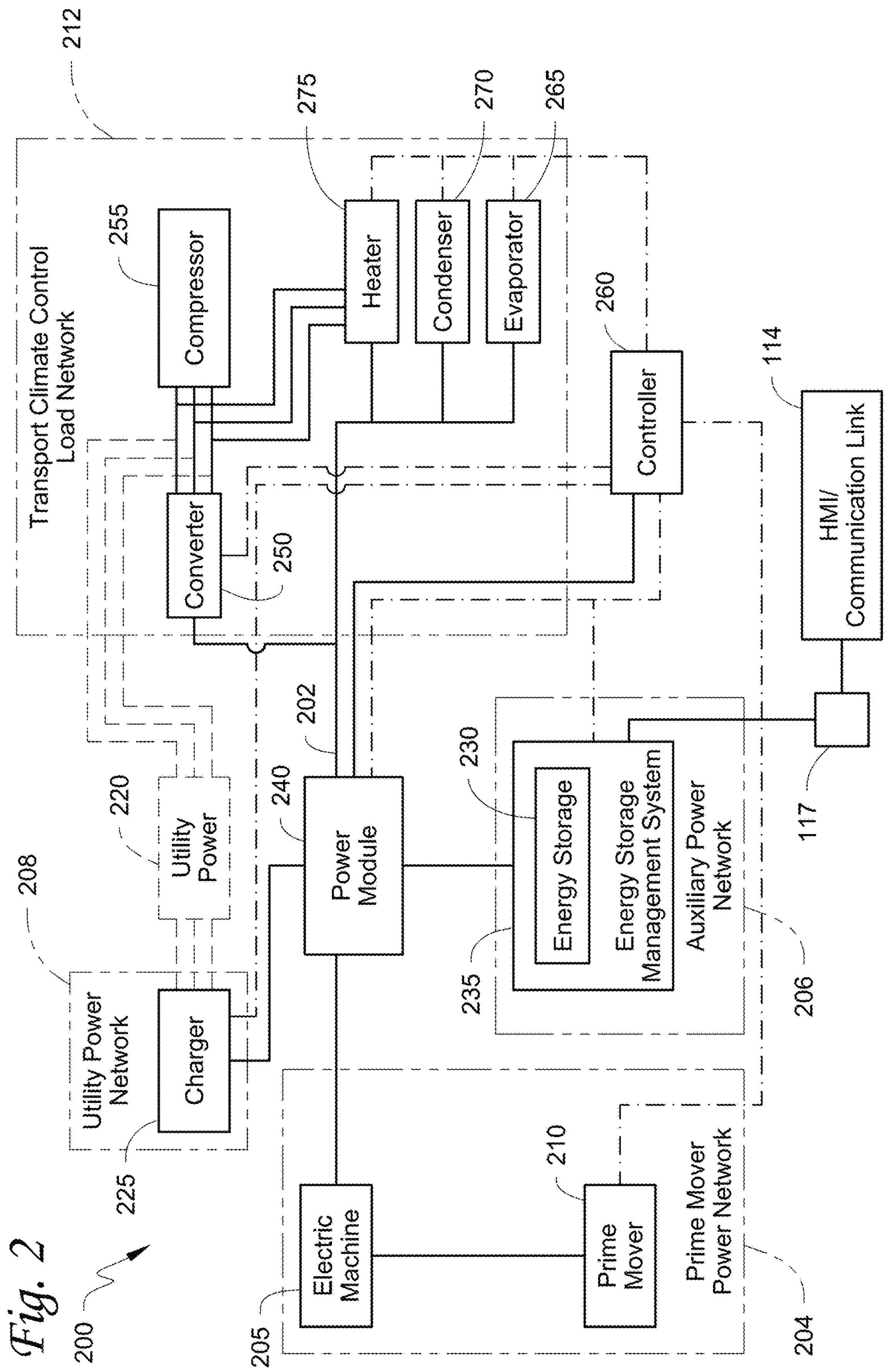
FIG. 2 illustrates a block diagram schematic of one embodiment of a power system for powering a transport climate control system, according to one embodiment.

FIG. 2 illustrates a block diagram schematic of one embodiment of a power system 200 for powering a transport climate control system. The power system 200 can power the transport climate control systems 100, 124, 135, 155 shown in FIGS. 1A-ID. The power system 200 includes a prime mover power network 204, an auxiliary power network 206, a utility power network 208, and a transport climate control load network 212 connected to a power conversion module 240. It will be appreciated that in some embodiments, the power system 200 can include one or more of the prime mover power network 204, the auxiliary power network 206, and/or the utility power network 208. For example, in one embodiment, the power system 200 only includes the prime mover power network 204, without the auxiliary power network 206 and/or the utility power network 208. In another embodiment, the power system 200 includes the prime mover power network 204 and the utility power network 208, without the auxiliary power network 206. The power system 200 can use one or more of the prime mover power network 204, the auxiliary power network 206 and the utility power network 208 at any given time to provide power to the transport climate control load network 212. While the power system 200 is configured to be a hybrid power system that is powered by the prime mover power network 204 in combination with the auxiliary power network 206 and/or the utility power network 208. However, it will be appreciated that the embodiments described herein can be used with a fully electric power system that does not include a prime mover or prime mover power network to provide power to the transport climate control system.

The prime mover power network 204 includes a prime mover 210 and an electric machine 205 that can provide electric power to the power conversion module 240. The prime mover 210 is configured to generate mechanical power and the electric machine 210 is configured to convert the mechanical power to electric power. The generated electric power is then sent by the prime mover power network 205 to the power conversion module 240. In some embodiments, the prime mover 210 can be a vehicle prime mover used to move the vehicle that also provides power to the transport climate control load network 212 when available. It will be appreciated that in these embodiments, mechanical power generated by the prime mover 210 that can be used in the system 200 can be inconsistent and based on operation and vehicle load requirements of the vehicle. In other embodiments, the prime mover 210 and the electric machine 205 can be part of a generator set that provides power to the transport climate control load network 212. In yet some other embodiments, the prime mover 210 and the electric machine 205 can be part of a CCU (e.g., the CCU 110, 126, 140, 170 shown in FIGS. 1A-D) to provide power to the transport climate control load network 212. It will be appreciated that in some embodiments the maximum power available from the prime mover power network 204 may never be sufficient to operate the transport climate control system operating at a full capacity.

In some embodiments, the electric machine 205 can be an electrical generator that can provide DC power to the transport climate control load network 212. In some embodiments, the electric machine 205 can include an alternator and a rectifier or an AC-DC converter (not shown) that rectifies or converts the AC power generated by the electric machine 205 to a DC power.

It will be appreciated that when the vehicle is an electric vehicle, there may be no prime mover 210. The electric machine 205 can be a motor generator that is used with a high voltage (e.g., in a range between 60V and 1500V; for example 400V, 800V, etc.) DC battery to run the vehicle. Electric vehicles can also provide a relatively high voltage (e.g., 400V, 800V, etc.) DC power source (e.g., a battery pack, a rechargeable energy storage system (RESS), etc.). Electric vehicles can include one or more DC-DC converters (e.g., two DC-DC convertors) to convert the relatively high voltage (e.g., 400V, 800V, etc.) to a low voltage (e.g., in a range between 0V and 60V; for example 12V). That is, the electric machine 205 can be replaced with a DC-DC converter having similar parameters as the electric machine 205 in order to be able to provide prime mover network power to the power conversion module 240.

In some embodiments, the electric machine 205 can provide a low voltage (e.g. 12V) from the prime mover power network 204 to the power conversion module 240 for powering the transport climate control load network 212. In some embodiments, an electric vehicle can provide for example, 7 kW-Hour energy from a 45 kW-Hour storage of the prime mover power network 204 to the power conversion module 240 to run the transport climate control load network 212. In some embodiments, the prime mover power network 204 can use take off power (e.g., electric power take off or ePTO) from the low voltage (for example, 12V) system for loads such as the power conversion module 240. The high voltage power can provide power for driving the vehicle (e.g., transmission power take off) and the power system 200 but may not take electric power from the high voltage system.

It will be appreciated that in a hybrid vehicle, there may be a machine (such as the electric machine 205) and/or a low voltage DC power source that can provide a low voltage (e.g., 12V) to the power conversion module 240.

It will be appreciated that any type of power source can provide power to the power system 200 and can be part of the prime mover power network 204. This can include, for example, the electric machine 205, a battery, a RESS, a generator, an axle-mounted generator, a power take off (PTO) device or ePTO device with an auxiliary converter, etc.

The auxiliary power network 206 includes an energy storage source 230 and an energy storage management system 235. In some embodiments, the auxiliary power network 206 can be part of the transport climate control system and potentially housed within a CCU. In other embodiments, the auxiliary power network 206 can be external to the transport climate control system and part of the prime mover power network 204. In yet some other embodiments, the auxiliary power network 206 can be external to the transport climate control system and external to the prime mover power network 204.

In some embodiments, the energy storage source 230 can include one or more batteries. For example, in one embodiment the energy storage source 230 can include two batteries (not shown). Each of the batteries can also be connected to the power conversion module 240. It will be appreciated that the energy storage source 230 can provide sufficient energy to power the transport climate control load network 212 by itself. In some embodiments, the energy storage source 230 can provide 12 VDC or 24 VDC. In other embodiments, the energy storage source 230 can provide 48 VDC.

The energy storage management system 235 is configured to monitor a charge level of one or more batteries of the energy storage source 230 and charge the one or more batteries of the energy storage source 230. The energy storage management system 235 can communicate with, for example, the controller 260 and/or a controller (not shown) of the power conversion module 240 to provide a charge level of one or more batteries of the energy storage source 230. Also, the energy storage management system 235 can receive instructions from, for example, the controller 260 and/or the controller of the power conversion module 240 indicating the amount of power from the energy storage source 230 should be supplied to the power conversion module 240.

It will be appreciated that in other embodiments, the energy storage management system 235 can be configured to monitor other parameters (e.g., monitor the fuel levels for an engine-driven system) and communicate the monitored data with, for example, the controller 260 and/or a controller (not shown) of the power conversion module 240.

The power conversion module 240 is configured to convert a power from both of the prime mover power network 204 and the auxiliary power network 206 to a load power compatible with one or more loads of the transport climate control load network 212. That is, the power conversion module 240 is configured to buck or boost power from the prime mover power network 204 and is configured to buck or boost power from the auxiliary power network 206 to obtain the desired load power. In some embodiments, the power conversion module 240 can include one or more DC/DC converters. For example, the power conversion module 240 can include one DC/DC converter to convert the power generated by the prime mover power network 204 and/or the auxiliary power network 206 to a voltage compatible with one or more loads of the transport climate control load network 212 and a second DC/DC converter to convert the auxiliary network power to a voltage compatible with one or more loads of the transport climate control load network 212. The converted power from the prime mover power network 204 and the converted power from the auxiliary power network 206 are combined to obtain a load power compatible with one or more loads of the transport climate control load network 212. The load power outputted by the power conversion module 240 can then be provided on a load DC bus 202 to the transport climate control load network 212. In some embodiments, the load power can be a low voltage DC power (e.g., between 0-60V DC). In other embodiments, the load power can be a high voltage DC power (e.g., between 60-1500V DC).

In some embodiments, the power conversion module 240 can include a controller (not shown) configured to monitor and control the power conversion module 240. In some embodiments, the controller can communicate with the controller 260.

The power system 200, and particularly the power conversion module 240, is controlled by the controller 260 of the transport climate control load network 212. The controller 260 can be, for example, the controller 107, 130, 145 and 180 shown in FIGS. 1A-D. In some embodiments, the power conversion module 240 can monitor the amount of current and/or voltage provided by the prime mover power network 204. Also, in some embodiments, the power conversion module 240 can monitor the amount of current and/or voltage drawn by components of the transport climate control load network 212. The power conversion module 240 can be configured to communicate the amount of current and/or voltage provided by the prime mover power network 204 and the amount of current and/or voltage drawn by components of the transport climate control load network 212.

Components of the transport climate control load network 212 can be, for example, part of a CCU that is mounted to the body of the vehicle (for example, truck, van, etc.). In some embodiments, the CCU can be above the cab of the truck (as shown in FIG. 1A). In another embodiment, the CCU can be on the top of the TU (for example, a top of a box where the external condensers are located) (see FIG. 1B). In some embodiments, the components of the transport climate control load network 212 can be DC powered components. In some embodiments, the components of the transport climate control load network 212 can be AC powered components. In some embodiments, the transport climate control load network 212 can include both DC powered components and AC powered components.

As shown in FIG. 2, the transport climate control load network 212 includes at least one compressor 255, one or more evaporator blowers 265, one or more condenser fans 270, the heater 275, and the controller 260. It will be appreciated that in some embodiments, the transport climate control load network 212 does not include the heater 275. It will also be appreciated that in some embodiments, the transport climate control load network 212 does not include the at least one compressor 255. It will further be appreciated that in some embodiments, the transport climate control load network 212 can include thermal management of batteries, power electronics, etc. The transport climate control load network 212 also includes an inverter 250 that is configured to boost the load power and convert the boosted load power to an AC load power. That is, the inverter 250 is configured to boost power from the DC load bus 202 and converts the power to AC power to drive the compressor 255. In some embodiments, the inverter 250 can convert the load power to a high voltage AC power. As shown in FIG. 2, the inverter 250 is configured to power the compressor 255 and optionally the heater 275. It will be appreciated that in other embodiments, the inverter 250 can power other components of the transport climate control load network 212 such as, for example, the one or more evaporator blowers 265, the one or more condenser fans 270, etc. In some embodiments, the inverter 250 can be a Compressor Drive Module (CDM).

In some embodiments, the inverter 250 can convert low voltage DC power (for example, 12 VDC, 24 VDC, 48 VDC) from the load DC bus 202 and provide AC power (for example, 230 VAC three phase, 460 VAC three phase, etc.) to drive the compressor 255. In particular, the inverter 250 drives the compressor 255 to meet demand of the transport climate control system.

The load DC bus 202 is connected to and powers each of the inverter 250, the one or more evaporator blowers 265, the one or more condenser fans 270, the heater 275, and the controller 260. It will be appreciated that the inverter 250 with the compressor 255 can require the most power of the various loads of the transport climate control load network 212. As shown in FIG. 2, in some embodiments, the inverter 250 can also power the heater 275.

The utility power network 208 is configured to charge the energy storage source 230 of the auxiliary power network 206 when, for example, the vehicle is parked and has access to a utility power source 220. In some embodiments, the utility power network 208 can also provide power to operate the transport climate control load network 212 when, for example, the vehicle is parked and has access to a utility power source. The utility power network 208 includes the AC-DC converter 225. The utility power source (e.g., shore power, etc.) 220 can be connected to the AC-DC converter 225 to provide AC power input to the AC-DC converter 225. The AC-DC converter 225 is configured to convert the AC power from the utility power source 220 and to provide converted DC power to the power conversion module 240.

While FIG. 2 shows a single AC-DC converter 225, it is appreciated that in other embodiments the power system 200 can include two or more AC-DC converters. In embodiments where there are two or more AC-DC converters, each of the AC-DC converters can be connected to the utility power 220 to provide additional power capacity to the power system 200. In some embodiments, each of the AC-DC converters can provide different amounts of power. In some embodiments, each of the AC-DC converters can provide the same amount of power.

In some embodiments, the utility power 220 can be connected directly to the compressor 255 and provide power to drive the compressor 255 thereby bypassing the inverter 250. In some embodiments, the inverter 250 can be used as an AC-DC converter and convert power received from the utility power 220 into DC power that can be provided by the inverter 250 to the load DC bus 202.

In some embodiments, the compressor 255 can be a variable speed compressor. In other embodiments, the compressor 255 can be a fixed speed (e.g., two-speed) compressor. Also, in some embodiments, the heater 275 can be configured to receive power from the inverter 250. While the compressor 255 shown in FIG. 2 is powered by AC power, it will be appreciated that in other embodiments the compressor 255 can be powered by DC power or mechanical power. Further, in some embodiments, the prime mover 210 can be directly connected (not shown) to the compressor 255 to provide mechanical power to the compressor 255.

When the compressor 255 and/or the heater 275 are powered directly by the utility power 220, the compressor 255 and/or the heater 275 can be turned on and off (e.g., operate in a start/stop mode) in order to control the amount of cooling provided by the compressor 255 and/or the amount of heating provided by the heater 275.

The controller 260 is configured to monitor and control operation of the transport climate control system. In particular, the controller 260 can control operation of the compressor 255, the heater 275, the one or more condenser fans 270, the one or more evaporator blowers 265 and any other components of the vehicle powered transport climate control system. In some embodiments, the controller 260 can monitor the amount of power drawn by the components of the transport climate control load network 212. The controller 260 can also be configured to control the power system 200. The power system 200 can also include one or more sensors (not shown) that are configured to measure one or more power parameters (e.g., voltage, current, etc.) throughout the power system 200 and communicate power parameter data to the controller 260. As shown in FIG. 2, the controller 260 can communicate with all of the components of the transport power system 200 via a communication link.

FIG. 3 is a flowchart of a method 300 for controlling a transport climate control system (e.g., the transport climate control systems 100, 124, 135, 155 shown in FIGS. 1A-1D), according to one embodiment. The transport climate control system can be powered by, for example, the power system 200 shown in FIG. 2. It will be appreciated that the method 300 can also be used with a fully electric power system that does not include a prime mover or prime mover power network to provide power to the transport climate control system.

At 302, a controller (e.g. climate controller 107, 130, 145, or 180) obtains one or more route parameters. The route parameters may include, for example, a route to be traveled by the transport unit including the transport climate control system, a type of goods being carried in a climate controlled space of the transport unit, a number of stops to be made by the transport unit during the route, an estimated number of times a door of the climate controlled space conditioned by the transport climate control system will be opened during the route, an estimated amount of time the door of the climate controlled space will be open during the route. In an embodiment, the one or more route parameters are obtained via user input at a human-machine interface. In an embodiment, the one or more route parameters are obtained from a communications link to a remote server. In an embodiment, the remote server from which the one or more route parameters are obtained is a dispatching server. In an embodiment, the remote server from which the one or more route parameters are obtained is the same remote server as that from which one or more conditions impacting the route are obtained at 304.

At 304, the controller obtains one or more conditions impacting the route via a communications link to a remote server. The one or more conditions impacting the route may include, for example, a weather forecast, current weather data, a traffic prediction, current traffic data, charging system location data, and customer delivery time constraints. Weather data and weather forecasts may include, for example, ambient temperatures, precipitation, cloud cover, solar intensity, and the like. Traffic data and predictions may include, for example, average traffic levels, current traffic updates and alerts, or the like. Charging system location data may include, for example, geographic locations of charging stations usable by the transport unit, identifiers associated with destinations along the route having charging stations available, or the like. Customer delivery time constraints may be periods of time during which a customer is expecting delivery of cargo carried by the transport unit, for example delivery windows such as two-hour or four-hour delivery windows.

At 306, the controller obtains a pre-route energy level of an energy storage source supplying power to the transport climate control system. The pre-route energy level of the energy storage source may be obtained from an energy storage management system such as energy storage management system 235. The energy storage source may be, for example, energy storage source 230 shown in FIG. 2. The energy storage source may include, for example, one or more batteries. In an embodiment, the energy level may be obtained by monitoring energy in and out of a node in the system, using the energy into the node to determine the energy level of the battery from a charging cycle, and using energy out of the battery to determine energy consumed since the charging cycle.

Once the controller obtains the route parameters at 302 and obtains the conditions impacting the route at 304, the method 300 proceeds to 308. At 308, the controller determines an expected energy consumption of the transport climate control system for the route based on the one or more route parameters and the one or more conditions impacting the route. The expected energy consumption may be determined using a mathematical model, such as a lookup table. The mathematical model may convert the one or more route parameters to energy values, such as based on predicted energy costs for climate control system run time, for example energy costs for climate control system run time based on ambient temperature, solar intensity, energy costs of door opening events, energy costs for pulldown following door opening events, and other such predicted costs, etc. Energy costs for climate control system run time may be based, for example, on ambient temperature, solar intensity, etc. In an embodiment, these energy costs may be scaled based on the one or more conditions impacting the route. The scaling may include, for example, modifying the energy cost based on route duration and the energy cost based on door openings based on weather forecasts, modifying the energy cost based on route duration based on predicted traffic data, and the like. In an embodiment, the mathematical model is a lookup table. The predicted costs resulting from each of the one or more route parameters may be determined and then summed to result in the expected energy consumption for the route.

Once the controller determines the expected energy consumption at 308 and obtains the pre-route energy level at 306, the method 300 proceeds to 310. At 310, the controller compares the pre-route energy level obtained at 306 to the expected energy consumption determined at 308. The comparison at 310 may be performed using, for example, a comparator. The method can then optionally proceed to 312 and/or 314.

Optionally at 312, a message that the route can be completed is presented via a display when the expected energy consumption is less than the pre-route energy level of the energy storage source. In an embodiment, the message may include a comparison of the pre-route energy level and the expected energy consumption, such as a percentage by which the pre-route energy level is equal to or exceeds the expected energy consumption. The method 300 can then optionally proceed to 316 and 320.

Optionally, at 314, when the expected energy consumption exceeds the pre-route energy level of the energy storage source the controller instructs the display to display an alert. The alert can inform a user that the energy level is less than the expected energy consumption for the route based on the parameters entered for the route. The alert may be presented via, for example display 109.

Optionally, at 316, the controller obtains one or more updated route parameters while the transport unit is in transit (e.g. traveling along the route). The one or more updated route parameters may be received from a remote server via a communications link. The remote server providing updated route parameters at 316 may be the remote server used to obtain route parameters at 302, such as a dispatching system. In an embodiment, the one or more updated route parameters may be input via an HMI. In an embodiment, the one or more updated route parameters may be determined by the controller on the transport unit, for example based on a timer measuring a duration that has passed since the beginning of the route, a number of door openings already completed obtained from a door sensor, a duration of door openings obtained from a door sensor, and the like. The method 300 can then optionally proceed to 318.

Optionally, at 318, the controller receives one or more updated conditions impacting the route from a remote server, while the transport unit including the transport climate control system is in transit. In an embodiment, the remote server is the same remote server that provides the one or more conditions impacting the route at 306. The method 300 can then optionally proceed to 322.

Optionally, at 320, the controller obtains a current energy level of the energy storage source while the transport unit is in transit. At a point in time while the transport unit is in transit, the current energy level of the energy storage source may be obtained from an energy storage management system such as an energy storage management system such as energy storage management system 235. The energy storage source may be, for example, energy storage source 230 shown in FIG. 2. In an embodiment, the energy level may be obtained by monitoring energy in and out of a node in the system, using the energy into the node to determine the energy level of the battery from a charging cycle, and using energy out of the battery to determine energy consumed since the charging cycle. In an embodiment, the energy storage management system may push the current energy level to the controller. In an embodiment, the controller may be configured to regularly sample the energy storage management for the current energy level. In an embodiment, the current energy level may include one or more parameters including state of charge, voltage, discharge rate, temperature, charge rate, system faults, or other data indicative of the current state of the energy storage source.

Optionally, at 322 an updated energy consumption is determined based on the one or more updated route parameters and the one or more updated conditions impacting the route. The updated energy consumption may be determined at 322 similarly to the expected energy consumption at 308. The climate controller 107 may implement a mathematical model to convert the updated route parameters into energy costs, based on the updated conditions impacting the route. The mathematical model may be a lookup table. The mathematical model may be the mathematical model used at 308. The energy costs determined using the mathematical model may be summed together to arrive at the updated energy consumption. Once the current energy level is obtained at 320 and the updated energy consumption is determined at 322, the method 300 then optionally proceeds to 324.

Optionally, at 324, the updated energy consumption is compared to the current energy level of the energy storage source. The comparison at 324 may be performed using, for example, the controller or the comparator used at 310. The method 300 then optionally proceeds to 326 and/or 328.

Optionally, at 326, the message that the route can be completed is presented via a display when the updated energy consumption is less than the current energy level of the energy storage source. The message may be the same as the message presented at 312. In an embodiment, the message may include a comparison of the current energy level and the updated energy consumption, such as a percentage by which the current energy level exceeds the updated energy consumption.

Optionally, at 328, one or more in-route remedial measures are determined when the updated energy consumption is less than the updated energy level of the energy storage source. In an embodiment, the one or more in-route remedial measures include at least one of an alternate route for the transport unit and an adjusted set point for the transport climate control system. When the remedial measures include an alternate route, the alternate route may be implemented, for example, via display of the alternate route on a display such as display 109. When the remedial measures include an adjusted set point for the transport climate control system a controller of the transport climate control system may implement this remedial measure by operating the transport climate control system in accordance with the adjusted set point. In an embodiment, the one or more remedial measures are determined at the remote server that provides the one or more conditions impacting the route at 318.

Optionally, 316, 318, 320, 322 and 324 may be iterated by returning to 316 and 320 while the transport unit is in transit when the comparison at 324 indicates that the updated energy consumption is less than the updated energy level of the energy storage source.

Aspects:

It is understood that any of aspects 1-10 may be combined with any of aspects 11-201.

Aspect 1. A method for providing energy consumption feedback for powering a transport climate control system using external data, the method comprising:

obtaining one or more route parameters;

obtaining one or more conditions impacting the route via a communications link to a remote server;

obtaining a pre-route energy level of an energy storage source supplying power to the transport climate control system;

determining, using a controller, an expected energy consumption of the transport climate control system for the route based on the one or more route parameters and the one or more conditions impacting the route;

comparing, using a controller, the expected energy consumption for the route to the pre-route energy level of the energy storage source; and when the expected energy consumption is less than the pre-route energy level of the energy storage source, displaying a message that the route can be completed via a display.

Aspect 2. The method according to aspect 1, wherein the one or more route parameters include one or more of:

a route to be traveled by a transport unit including the transport climate control system; a type of goods being carried in a space conditioned by the transport climate control system;

a number of stops to be made by the transport unit during the route;

an estimated number of times a door of a climate controlled space of the transport unit will be opened during the route;

an estimated amount of time the door of the climate controlled space will be open during the route.

Aspect 3. The method according to aspect 2, wherein the one or more route parameters are obtained via user input at a human-machine interface.

Aspect 4. The method according to any of aspects 2-3, wherein the one or more route parameters are obtained from a communications link to a dispatching server.

Aspect 5. The method according to any of aspects 1-4, wherein the one or more conditions impacting the route include at least one of:

a weather forecast;

current weather data;

a traffic prediction;

current traffic data;

charging system location data; and customer delivery time constraints.

Aspect 6. The method according to any of aspects 1-5, further comprising:

when the expected energy consumption is greater than the pre-route energy level of the energy storage source, determining one or more remedial measures.

Aspect 7. The method according to aspect 6, wherein the one or more remedial measures include at least one of an alternate route for a transport unit and an adjusted set point for the transport climate control system.

Aspect 8. The method according to any of aspects 1-7, further comprising:

while a transport unit including the transport climate control system is in transit, receiving one or more updated route parameters and one or more updated conditions impacting the route;

determining an updated energy consumption based on the one or more updated route parameters and the one or more updated conditions impacting the route;

obtaining a current energy level of the energy storage source;

comparing the updated energy consumption to the current energy level; and when the updated energy consumption is less than the current energy level of the energy storage source, displaying the message that the route can be completed via a display.

Aspect 9. The method according to aspect 8, further comprising:

when the updated energy consumption is greater than the updated energy level of the energy storage source, determining one or more in-route remedial measures.

Aspect 10. The method according to aspect 9, wherein the one or more in-route remedial measures include at least one of an alternate route for the transport unit and an adjusted set point for the transport climate control system.

Aspect 11. A transport climate control system, comprising:

a communications link configured to wirelessly communicate with a remote server;

an energy storage management system configured to determine an energy level of an energy storage source;

a display; and a controller, configured to:

obtain one or more route parameters;

obtain one or more conditions impacting the route from a remote server via the communications link;

obtain a pre-route energy level of an energy storage source supplying power to the transport climate control system;

determine an expected energy consumption of the transport climate control system for the route based on the one or more route parameters and the one or more conditions impacting the route;

compare the expected energy consumption for the route to the pre-route energy level of the energy storage source; and when the expected energy consumption is less than the pre-route energy level of the energy storage source, direct display of a message that the route can be completed via the display.

Aspect 12. The transport climate control system according to aspect 11, further comprising a human-machine interface configured to accept input of the one or more route parameters.

Aspect 13. The transport climate control system according to any of aspects 11-12, wherein the communications link is a wireless modem.

Aspect 14. The transport climate control system according to any of aspects 11-13, wherein the communications link is configured to receive the one or more route parameters from the remote server.

Aspect 15. The transport climate control system according to any of aspects 11-14, wherein the transport climate control system is a transport refrigeration system.

Aspect 16. The transport climate control system according to any of aspects 11-15, wherein the energy storage source includes one or more batteries.

Aspect 17. The transport climate control system according to any of aspects 11-16, further comprising a door sensor configured to determine when a door of a space conditioned by the transport climate control system is open or closed.

Aspect 18. The transport climate control system according to any of aspects 11-17, wherein the one or more route parameters include one or more of:

a route to be traveled by a transport unit including the transport climate control system;

a type of goods being carried in a space conditioned by the transport climate control system;

a number of stops to be made by the transport unit during the route;

an estimated number of times a door of a climate controlled space of the transport unit will be opened during the route;

an estimated amount of time the door of the climate controlled space will be open during the route.

Aspect 19. The transport climate control system according to any of aspects 11-18, wherein the one or more conditions impacting the route include at least one of:

a weather forecast;

current weather data;

a traffic prediction;

current traffic data;

charging system location data; and customer delivery time constraints.

Aspect 20. The transport climate control system according to any of aspects 11-19, wherein the controller is further configured to:

while a transport unit including the transport climate control system is in transit, receive one or more updated route parameters and one or more updated conditions impacting the route;

determine an updated energy consumption based on the one or more updated route parameters and the one or more updated conditions impacting the route;

obtain a current energy level of the energy storage source; compare the updated energy consumption to the current energy level; and when the updated energy consumption is less than the current energy level of the energy storage source, direct the display of the message that the route can be completed via a display.

The terminology used in this specification is intended to describe particular embodiments and is not intended to be limiting. The terms “a,” “an,” and “the” include the plural forms as well, unless clearly indicated otherwise. The terms “comprises” and/or “comprising,” when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word “embodiment” as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method for providing energy consumption feedback for powering a transport climate control system, the method comprising:

obtaining one or more route parameters;

obtaining one or more conditions impacting the route via a communications link to a remote server;

obtaining a pre-route energy level of an energy storage source supplying power to the transport climate control system;

determining, using a controller, an expected energy consumption of the transport climate control system for the route based on the one or more route parameters and the one or more conditions impacting the route;

comparing, using the controller, the expected energy consumption for the route to the pre-route energy level of the energy storage source; and displaying a message via a display, wherein the message is based on the expected energy consumption and the pre-route energy level of the energy storage source.

2. The method of claim 1, wherein the one or more route parameters include one or more of:

a route to be traveled by a transport unit including the transport climate control system;

a type of goods being carried in a space conditioned by the transport climate control system;

a number of stops to be made by the transport unit during the route;

an estimated number of times a door of a climate controlled space of the transport unit will be opened during the route; and an estimated amount of time the door of the climate controlled space will be open during the route.

3. The method of claim 2, wherein the one or more route parameters are obtained via user input at a human-machine interface.

4. The method of claim 2, wherein the one or more route parameters are obtained from a communications link to a dispatching server.

5. The method of claim 1, wherein the one or more conditions impacting the route include at least one of:

a weather forecast;

current weather data;

a traffic prediction;

current traffic data;

charging system location data; and customer delivery time constraints.

6. The method of claim 1, further comprising:

when the expected energy consumption is greater than the pre-route energy level of the energy storage source, determining one or more remedial measures.

7. The method of claim 6, wherein the one or more remedial measures include at least one of an alternate route for a transport unit and an adjusted set point for the transport climate control system.

8. The method of claim 1, further comprising:

while a transport unit including the transport climate control system is in transit, receiving one or more updated route parameters and one or more updated conditions impacting the route;

determining an updated energy consumption based on the one or more updated route parameters and the one or more updated conditions impacting the route;

obtaining a current energy level of the energy storage source;

comparing the updated energy consumption to the current energy level; and displaying a message via a display, wherein the message is based on the updated energy consumption and the current energy level of the energy storage source.

9. The method of claim 8, further comprising:

when the updated energy consumption is greater than the updated energy level of the energy storage source, determining one or more in-route remedial measures.

10. The method of claim 9, wherein the one or more in-route remedial measures include at least one of an alternate route for the transport unit and an adjusted set point for the transport climate control system.

11. A transport climate control system, comprising:

an energy storage management system configured to determine an energy level of an energy storage source;

a display; and a controller, configured to:

obtain one or more route parameters;

obtain one or more conditions impacting the route;

obtain a pre-route energy level of an energy storage source supplying power to the transport climate control system;

determine an expected energy consumption of the transport climate control system for the route based on the one or more route parameters and the one or more conditions impacting the route;

compare the expected energy consumption for the route to the pre-route energy level of the energy storage source; and direct display of a message via the display, wherein the message is based on the expected energy consumption and the pre-route energy level of the energy storage source.

12. The transport climate control system of claim 11, further comprising a human-machine interface configured to accept input of the one or more route parameters.

13. The transport climate control system of claim 11, further comprising a communications link configured to wirelessly communicate with a remote server, and wherein the controller is configured to obtain the one or more conditions impacting the route from the remote server via the communications link.

14. The transport climate control system of claim 13, wherein the communications link is configured to receive the one or more route parameters from the remote server.

15. The transport climate control system of claim 11, wherein the transport climate control system is a transport refrigeration system.

16. The transport climate control system of claim 11, wherein the energy storage source includes one or more batteries.

17. The transport climate control system of claim 11, further comprising a door sensor configured to determine when a door of a space conditioned by the transport climate control system is open or closed.

18. The transport climate control system of claim 11, wherein the one or more route parameters include one or more of:

a route to be traveled by a transport unit including the transport climate control system;

a type of goods being carried in a space conditioned by the transport climate control system;

a number of stops to be made by the transport unit during the route;

an estimated number of times a door of a climate controlled space of the transport unit will be opened during the route;

an estimated amount of time the door of the climate controlled space will be open during the route.

19. The transport climate control system of claim 11, wherein the one or more conditions impacting the route include at least one of:

a weather forecast;

current weather data;

a traffic prediction;

current traffic data;

charging system location data; and customer delivery time constraints.

20. The transport climate control system of claim 11, wherein the controller is further configured to:

while a transport unit including the transport climate control system is in transit, receive one or more updated route parameters and one or more updated conditions impacting the route;

determine an updated energy consumption based on the one or more updated route parameters and the one or more updated conditions impacting the route;

obtain a current energy level of the energy storage source;

compare the updated energy consumption to the current energy level; and direct the display of a message via the display, wherein the message is based on the updated energy consumption and the current energy level of the energy storage source.

* * * * *